Dec. 22, 1931.   L. F. LITTLE   1,837,782
REDUCTION REEL
Filed July 3, 1929
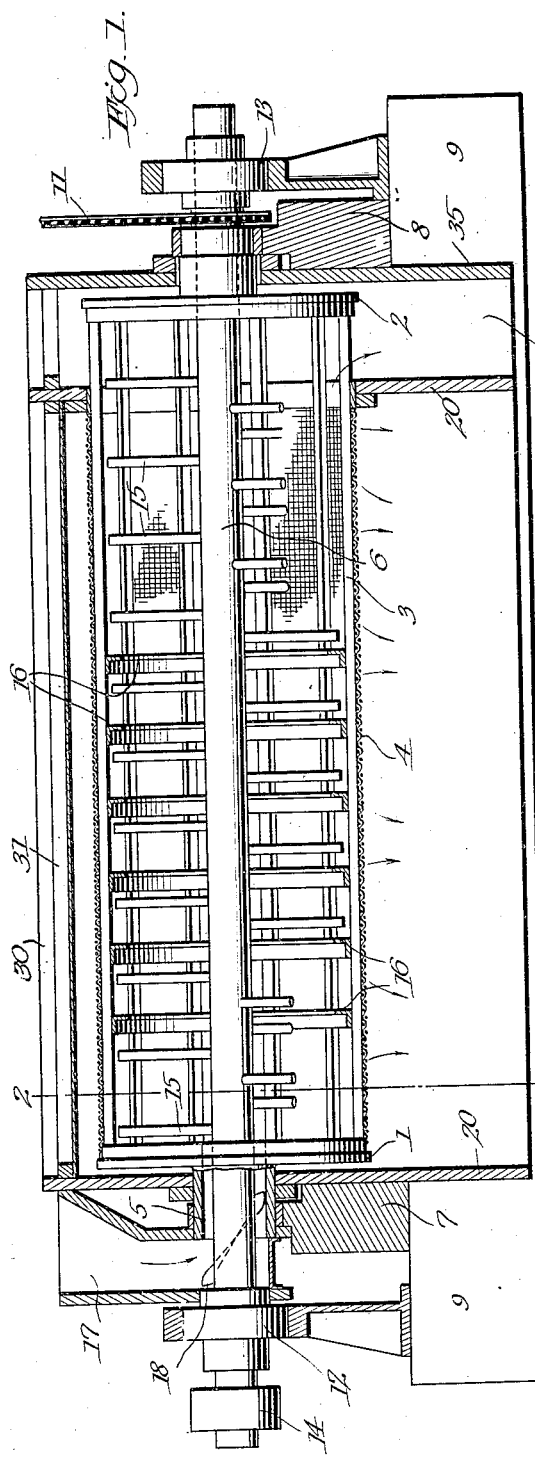

Patented Dec. 22, 1931

1,837,782

UNITED STATES PATENT OFFICE

LUCIUS FREEMAN LITTLE, OF OWENSBORO, KENTUCKY

REDUCTION REEL

Application filed July 3, 1929. Serial No. 375,709.

The present invention relates to improvements in material reduction means or apparatus for pulverizing initially solid bodies.

The machine hereinafter described while adapted for treating various materials has been found to be most efficient for operating on grain, particles of wood and cotton seed hulls.

Among the objects of the invention is to provide a means which will insure maximum production of pulverized material more speedily than has been effected by the forms of apparatus heretofore commonly employed.

With the foregoing and other objects in view an embodiment of the invention, illustrated in the accompanying drawings, will be more particularly described hereinafter.

Referring to the drawings,

Figure 1 is a vertical longitudinal sectional view through an apparatus constructed in accordance with the invention.

Figure 2 is a transverse section substantially on the line 2—2 of Figure 1.

Figure 3 is a view similar to Figure 2, illustrating a slightly modified construction.

Referring to the drawings in all figures of which like parts are designated by the same reference characters it will be seen that the apparatus comprises essentially an elongated cylinder supported to rotate about a substantially horizontal axis and having a foraminous side wall and a beater means rotatably arranged within the cylinder and having its shaft projecting outward beyond one end thereof.

The cylinder and beater shaft are independently rotated, the speed imparted to the shaft being greatly in excess of that at which the cylinder is rotated and the puverized material forced through the foraminous wall of the cylinder by the action of the beaters is collected in a casing that surrounds said cylinder wall.

As shown the cylinder comprises two heads, 1, 2, a plurality of rods 3 connecting said heads and a foraminous side wall formed preferably by suitable wire netting or screen which is secured in position around the rods 3.

Each cylinder head is provided with an outwardly extending tubular hub, the one on the head 1 providing an axial inlet opening through said head about the shaft 6 of the beater.

The foraminous wall of the cylinder terminates short of the cylinder head 2 to provide an outlet for the "tailings" or portions of the material that are not pulverized.

The hub-like extensions of the heads of the cylinder are mounted in suitable bearings on support members 7, 8, which as shown rest upon spaced longitudinally extending angle iron beams 9, 10. On the projecting hub of the cylinder head 2 is secured a suitable sprocket with which engages a drive chain 11 that receives power from any suitable means not shown and serves to rotate the cylinder as hereinafter more particularly described.

The beater shaft 6 as shown extends through both ends of the cylinder, being coaxial therewith, and is supported in suitable bearings 12, 13 mounted on the angle iron supports 9, 10. At one end said shaft is provided with a driving pulley 14 designed to be connected, by a suitable belt, with motor mechanism not shown so that the shaft will be rotated independently of the cylinder.

Within the cylinder the shaft is provided with a series of radially projecting beater arms 15 so spaced longitudinally of the shaft and related so that they will act to agitate material fed through the inlet opening 5 and assist in feeding such material longitudinally of the cylnider.

Preferably, as shown, the cylinder is provided interiorly with a plurality of rings 16 which as shown are of substantially right angular formation in cross section and are connected at their peripheries to the cylinder frame rods 3. Said rings are so related to the cylinder frame that flanges of each extend radially inward from the periphery of the cylinder and thus serve to retard the passage of the material lengthwise of the cylinder.

Any suitable number of rings 16 may be provided, the embodiment of the invention illustrated including six and these are all shown as arranged in a group relatively nearer the inlet opening 5 than the discharge opening of the cylinder.

A hopper 17 to receive the material to be treated is provided adjacent the head 1 of the cylinder and communicates with the adjacent inlet opening 5 in the tubular hub of said cylinder head. To assist in feeding the material through the inlet opening the beater shaft 6 is provided with a spiral conveyer member 18 so that as the shaft rotates the material is positively fed from the hopper 17 into the path of the beater arms 15.

The material forced through the openings in the sieve or netting wall of the cylinder is received in a casing comprising end walls 20.

The collecting casing also includes an imperforate wall extending around the foraminous section of the cylinder and converging downward below the cylinder, the free edges of said wall being slightly spaced to provide an outlet 21.

The pulverized material receptacle referred to is strengthened by a skeleton framework including longitudinally extending members 30, 31 and transverse bracing members 32.

As shown the sieve-like wall of the cylinder does not extend beyond the right hand end wall of the casing receiving the pulverized material and this end wall in connection with portions of the side wall of said casing which project beyond said end wall and an outer wall 35 provide a discharge passage 40 for the unpulverized material delivered through the outlet opening of the cylinder.

In operating the apparatus the beater arms are rotated at a much higher speed than the cylinder. For example, the beaters may revolve at the rate of 3600 R. P. M. while the speed of rotation of the cylinder will not exceed 40 R. P. M. The rates of speed here referred to are not intended to be at all limiting as there can be, of course, considerable variation, but it is considered important to have the beaters revolve at a very much higher speed than the cylinder and the rate at which the beaters should revolve in order to be practical for the purposes of the present invention is greatly in excess of the speeds heretofore employed in apparatus of the same type or general character. It is believed that the purposes of the invention cannot be satisfactorily attained if the beaters are rotated at less than 1000 R. P. M.

Preferably the cylinder and beater shaft are rotated in opposite directions and the action of the beater arms assisted by the rings 16 is to effect a very complete and fine pulverization of solid materials such as shavings, cotton seed hulls, grain, etc., fed through the inlet opening 5. As shown the beater arms are of cylindrical form in cross section while the longitudinal rods 3 of the cylinder framework are shown as being of polygonal form in cross section. The cross sectional form of the beater arms and said rods can, of course, be varied and according to the particular shape given these elements will depend somewhat the extent to which the material treated is reduced. If both the rods and beater arms are of polygonal form in cross section the number of cutting edges against which the material is driven will be increased.

The pulverizing action is assisted by the rings 16 and these may be of any suitable abrasive material.

As previously noted practical experience has shown that an apparatus constructed and operated as hereinbefore described is very effective in making wood flour from shavings and recovering lint from cotton seed hulls. Also it has been found very effective in producing flour from various grains.

It is believed that the operation and advantages of the invention will be apparent from the foregoing description in connection with the drawing and it is, of course, to be understood that the latter is to be considered as illustrative rather than as limiting the invention and that except where hereinafter particularly described in the appended claims the invention is not to be understood as being limited to the exact details shown as there can be considerable modification thereof without departing from the invention.

One such modification is illustrated in Figure 3. In this form of the invention the foraminous wall 4' is arranged within the rods 3, which connect the cylinder heads. In this form of the invention the rods 3 do not act as a portion of the pulverizing means. Experience with apparatus embodying the improvements hereinbefore described has shown that when treating certain materials, for example, removing the lint from cotton seed hulls, there is a tendency for the light fluffy material to adhere to the inner surface of the screen if this is arranged outside of the rods 3, as shown in Figures 1 and 2, owing apparently to the very high speed at which the cylinder is rotated. By the arrangement shown in Figure 3, this objection is overcome and the outer ends of the beater arms may be separated from the screen to such a slight extent that the inner surface of the screen is effectively cleaned.

What I claim is:

1. In an apparatus for the purpose described, the combination of a cylinder supported to rotate about a substantially horizontal axis and having a foraminous side wall and an inlet opening at one end, a rotary beater within the cylinder, means for feeding material through said inlet into the cylinder, and a plurality of rings within, and concentric with the cylinder to which they are connected at their peripheries, said rings extending inwardly beyond the circumference of the path of travel of the beater and cooperating with the beater in reducing material fed to the cylinder as aforesaid, means for rotating the cylinder, means for rotating the beater at a speed in excess of the speed of rotation of the cylinder, and means for collecting the powdered material forced through the foraminous wall of the cylinder.

2. In an apparatus for the purpose described, the combination of a cylinder supported to rotate about a substantially horizontal axis and having a foraminous side wall and an inlet opening at one end, a rotary beater comprising a shaft arranged co-axial with the cylinder, and extending through one end thereof, and a series of radially projecting arms on the shaft within the cylinder, means for feeding material to be treated through said inlet to the cylinder, a plurality of rings within and peripherally secured to the cylinder, said rings being spaced longitudinally of the axis of the cylinder and each being of substantially right angle form in cross section to provide a section extending radially inward from the foraminous wall of the cylinder, to points beyond the outer ends of the beater arms, means for rotating the cylinder, means for rotating the beater at a speed in excess of the speed of rotation of the cylinder, and means for collecting the powdered material forced through the foraminous wall of the cylinder.

3. In an apparatus for the purpose described, the combination of a cylinder mounted to rotate about a substantially horizontal axis and having a foraminous side wall, said cylinder being provided at its ends, respectively, with an inlet and an outlet, a shaft extending longitudinally within the cylinder, a series of beater arms projecting radially from said shaft within the cylinder and arranged to move material from the inlet to the outlet while disintegrating the same, and means extending radially inward from the peripheral wall of the cylinder to points nearer the beater shaft than the outer ends of the beater arms for retarding the movement of material toward the outlet under the action of the beaters.

4. In an apparatus for the purpose described, the combination of a cylinder mounted to rotate about a substantially horizontal axis and having a foraminous side wall, said cylinder being provided at its ends, respectively, with an inlet and an outlet, a shaft extending longitudinally within the cylinder, a series of beater arms projecting radially from said shaft within the cylinder and arranged to move material from the inlet to the outlet while disintegrating the same, a plurality of rings, spaced longitudinally of the shaft, extending inward from the peripheral wall of the cylinder between the beater arms and cooperating with said beater arms in reducing material passing from the cylinder inlet to the outlet, means for rotating the beater shaft, and independent means for rotating the cylinder.

5. In an apparatus for the purpose described, the combination of a cylinder mounted to rotate about a substantially horizontal axis and having a formainous side wall, said cylinder being provided at its ends, respectively, with an inlet and an outlet, a shaft extending longitudinally within the cylinder, a series of beater arms projecting radially from said shaft within the cylinder and arranged to move material from the inlet to the outlet while disintegrating the same, a plurality of parallel rings, spaced in the direction of the length of the beater shaft, extending inward from the peripheral wall of the cylinder, and adapted to retard movement of material toward the outlet under the action of the beater arms and to cooperate with said arms in disintegrating the material treated, said rings being arranged relatively nearer the cylinder inlet than the outlet, means for rotating the beater shaft at a relatively high speed, and means for rotating the cylinder at a lower speed.

In testimony whereof I have hereunto set my hand.

LUCIUS FREEMAN LITTLE.